United States Patent [19]
Felstehausen

[11] 3,804,228
[45] Apr. 16, 1974

[54] SPREADER CONVEYOR
[75] Inventor: Eugene F. Felstehausen, Hoopeston, Ill.
[73] Assignee: FMC Corporation, San Jose, Calif.
[22] Filed: Aug. 28, 1972
[21] Appl. No.: 284,301

[52] U.S. Cl............................ 198/31 AB, 214/6 DK
[51] Int. Cl............................................. B65g 47/26
[58] Field of Search.......... 198/31 AB, 139; 271/77, 271/78; 214/6 DK

[56] References Cited
UNITED STATES PATENTS
3,550,749  12/1970  Story......................... 198/139 X
3,411,773  11/1968  Cornwall..................... 214/6 DK X

Primary Examiner—Richard E. Aegerter
Assistant Examiner—Douglas D. Watts
Attorney, Agent, or Firm—C. E. Tripp

[57] ABSTRACT

A spreader conveyor is shown connected to a meat patty machine for receiving patties individually and distributing them across the width of a discharge conveyor such as a freezer conveyor, with the spreader conveyor being operated by a variable speed drive from a patty machine shaft.

The spreader conveyor has a rigid frame with an endless wire conveyor belt trained around the ends of the frame. The entire frame and conveyor are reciprocated in a manner which does not require take up of an extra loop in the flexible conveyor belt. This is accomplished by advancing both conveyor reaches in the frame by upper and lower sprockets moving in the same direction whereas the conveyor frame is rapidly retracted to deposit patties onto the discharge belt by reversing the lower sprocket and driving it at a higher speed than the upper sprocket, which runs continuously in the advance direction. Thus the upper reach of the conveyor continues to be driven in its original direction whereas the conveyor frame and the delivery end of the belt are retracted, thereby dropping a row of patties onto the discharge belt.

13 Claims, 29 Drawing Figures

FIG_14

FIG_15

FIG_16

SPREADER CONVEYOR

DESCRIPTION OF PRIOR ART

The patent to Lanham, Jr. U.S. Pat. No. 3,460,667, Aug. 12, 1969, shows a spreader conveyor which does not have a rigid frame so that only the discharge end of the spreader conveyor reciprocates, this reciprocation being accommodated by take up mechanism for the lower reach of the belt. The conveyor is advanced and quickly retracted by a reciprocating endless chain connected to a two speed hydraulic piston.

Baker U.S. Pat. No. 941,296, Nov. 23, 1909, shows a reciprocating conveyor wherein the leading roller is mounted on a rack and pinion device and a belt take up is provided for a loop in the lower reach of the conveyor.

Callow U.S. Pat. No. 1,130,568, Mar. 2, 1915 shows a spreading conveyor having a gravity take up for the conveyor loop with a discharge roller operated by a reciprocating cam operated cable.

Baker U.S. Pat. No. 3,106,280, Oct. 8, 1963, shows a spreading conveyor with a take up loop and using an endless chain for reciprocating the discharge end of the spreader conveyor.

Pinault et al U.S. Pat. No. 3,150,761, Sept. 29, 1964, shows a reciprocating transfer conveyor of the take up type wherein the discharge roller of the conveyor is reciprocated by a sliding mechanism operated by an oscillating lever arm.

Hans-Jurgen Kiesser U.S. Pat. No. 3,324,987, June 13, 1967, shows a spreader conveyor of the loop take up type wherein the discharge rollers are reciprocated by a carriage and a crank operated lever arm.

German Pat. No. 392,947, March 1924, shows a spreader conveyor the loop take up type wherein the discharge roller is reciprocated by a carriage and crank mechanism.

The patent to Pease, U.S. Pat. No. 2,432,541, Feb. 20, 1951, shows a reversible speed changing mechanism employing chain driven, oppositely rotating air clutches for driving an output shaft at different speeds in opposite directions.

Wilson U.S. Pat. No. 2,809,530, Oct. 15, 1957, shows a reversing mechanism showing oppositely turning driven gears coupled to fast and slow speed clutches for driving a single output pulley in opposite directions at different speeds.

Keller et al U.S. Pat. No. 3,151,503, Oct. 6, 1964, shows a transmission system having forward and reversing clutches driven by a chain which in turn drive an output chain in opposite directions. The clutches are mechanically operated.

Hagen U.S. Pat. No. 3,457,805, July 29, 1969 shows a transmission mechanism for steering vehicles having meshed gears with chain driven forward and reverse clutches that are mechanically operated.

SUMMARY OF THE INVENTION

In the illustrated embodiment, the spreader conveyor of the present invention is associated with a patty machine that delivers meat patties one by one to the spreader conveyor with the spreader conveyor moving slowly in its advance direction until its discharge roller has moved across a laterally running discharge of freezing conveyor, whereupon the discharge roller of the spreader conveyor is rapidly retracted to deposit a row of patties on the discharge conveyor.

The spreader conveyor has two drives, one being a continuous but variable speed drive operated from a continuously rotating shaft in the patty machine. The adjustment of this drive for the spreader conveyor is made in accordance with the rate of the delivery of patties from the patty machine.

The other drive for the spreader conveyor, which assists in the advance thereof and which also retracts the conveyor for spreading a row of patties on the discharge conveyor, is derived from a continuously running electric motor forming part of the spreader conveyor driving apparatus.

An important feature of the present invention lies in the fact that no loop take up devices for the lower reach of the spreader conveyor belt are required, thereby reducing belt flexure and prolonging the life of the belt. These belts are usually made up of stainless steel links and wires and are quite expensive to replace. In accordance with the present invention, the endless stainless steel belt is simply trained around rollers at opposite ends of a rigid frame. The entire frame is reciprocated in the advance direction preparatory for spreading the patties on the discharge conveyor, by driving both the upper and lower reaches of the spreader conveyor belt from upper and lower companion sprockets. The upper sprocket is driven continuously from the patty machine whereas the lower sprocket is driven from the aforesaid separate motor associated with the spreader conveyor. By first driving these sprockets in opposite directions and at the same speed, the entire spreader conveyor belt and frame assembly is advanced across the discharge conveyor, as previously mentioned. At the end of the spreader conveyor advance motion the spreader conveyor discharge roller and frame are quickly retracted by reversing the lower sprocket and by driving it at a substantially higher speed than that of the continuously running upper sprocket. Upon such reversal, the spreader conveyor is rapidly retracted. During retraction the upper reach of the spreader conveyor belt is driven relative to the frame (during advance the belt was stationary relative to the frame) and hence the upper reach continues to advance relative to the patty machine. Thus the conveyor deposits patties on the discharge conveyor while receiving a new row of patties from the patty machine. The utilization of a drive shaft from the patty or article forming machine as part of the mechanical drive for the spreader conveyor, insures controlled synchronism of the spreader conveyor with the article forming machine.

The advance and retract mechanism of the present invention employs an advance clutch associated with the continuous drive from the patty machine for driving the lower reach of the conveyor in synchronism with the upper reach and a retract clutch associated with the separate spreader conveyor motor for reversing the lower reach and driving it at a higher speed to provide the retraction just mentioned.

Another feature of the present invention relates to sensing completion of the advance stroke of the spreader conveyor in accordance with patty position but without damaging the patties. This is accomplished by sensing presence of a patty with a lightweight, gravity wheel or roller which makes no noticeable impression on the patties and which operates a trip mechanism that causes the retract clutch to be engaged for the purposes described above.

In order to end the retract stroke and initiate a new advance cycle of the spreader conveyor, and trip mechanism is re-set or cocked by a cocking device at the rear end of the spreader conveyor after it has been fully retracted. The cocking device includes a cam mechanism that operates a shaft that cocks the trip device that was previously tripped by the patty sensing wheel.

Means are also provided for ending the advance stroke of the spreader conveyor even though a patty is not present for sensing by the patty sensing wheel. Since the patty sensing wheel is so mounted that it just touches the patty, if no patty were present, it would not be engaged by the end of the conveyor and the advance stroke would not be terminated. However, an auxiliary trip arm will, under these circumstances, be engaged by the discharge end of the spreader conveyor at the end of its advance stroke and initiate the retraction stroke, even though no patty was present at the delivery end of the spreader conveyor.

Thus the spreader conveyor of the present invention is a simple construction, does not require take up loops and corresponding extra lengths of the costly stainless steel belt and the belt life is extended. The conveyor mechanism is electrically controlled without need for fluid pressure control. Also, the conveyor is operated in both directions by a simple rotary drive mechanism, as opposed to the cumbersome, heavy and expensive reciprocating mechanism typical of certain prior devices. Also, no overhead chains are required to reciprocate the spreader conveyor of the present invention contrary to certain other devices in the prior art.

GENERAL DESCRIPTION OF THE APPARATUS

Figures 1, 1A, 1B:
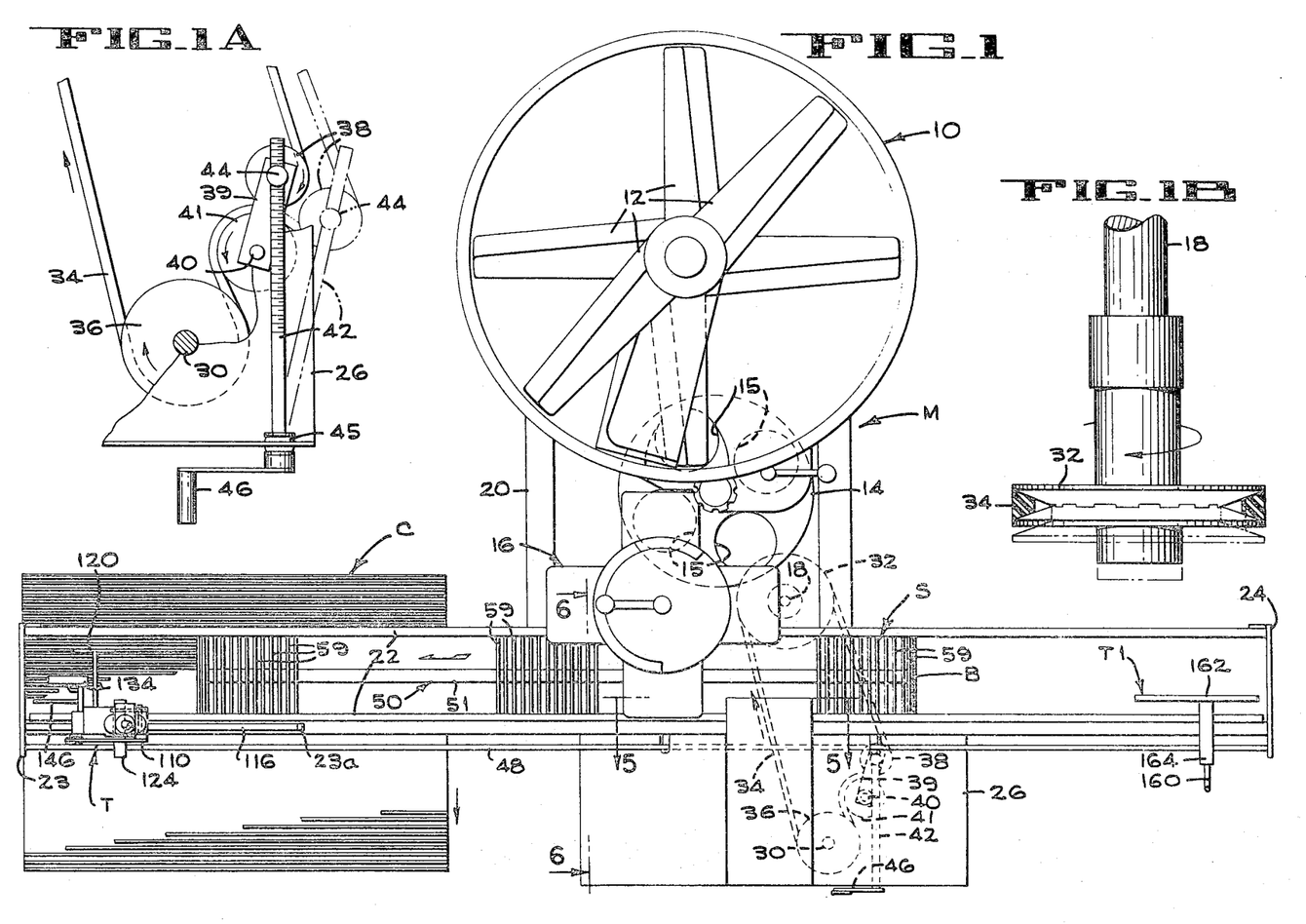
FIG. 1 is a plan view showing a patty machine, spreader conveyor and discharge conveyor embodying the present invention.
FIG. 1A is an enlarged detail showing the belt tensioning mechanism for the continuous but variable speed drive from the patty machine.
FIG. 1B is a detail showing the variable speed pulley on the patty machine shaft.
Figure 2:
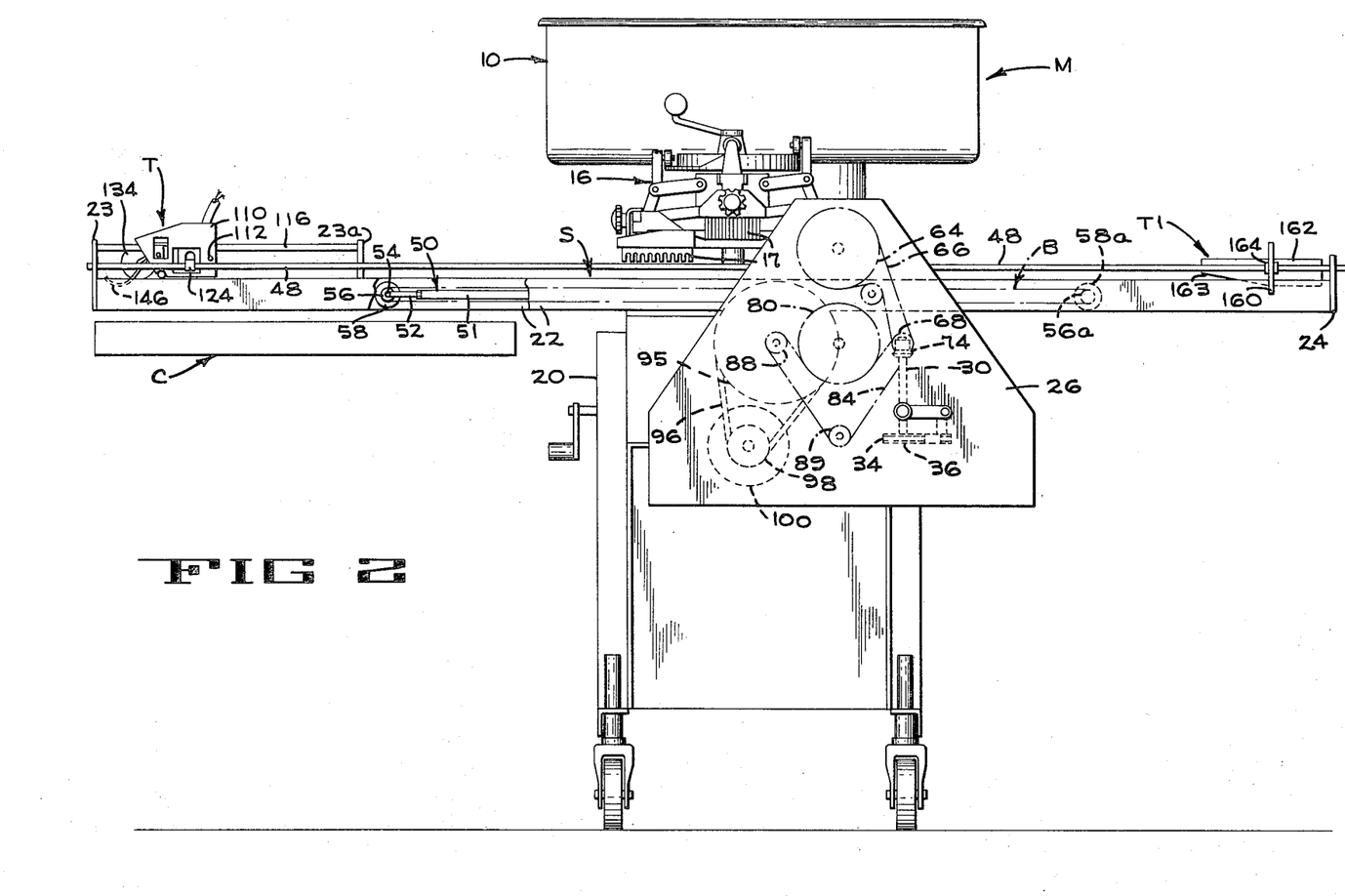
FIG. 2 is a side elevation of a patty machine, spreader conveyor and discharge conveyor.

FIGS. 1 and 2 show an assembly of a patty machine M, a spreader conveyor S embodying the present invention for delivering rows of patties to a discharge conveyor, such as a freezer conveyor C. The details of the patty machine M are not critical to the present invention, it being understood that the patty machine takes ground beef, forms it into patties and delivers the patties one by one to the spreader conveyor. It will be understood at this point that broadly, utilization of the basic spreader conveyor of the present invention is not limited to association with a meat patty machine, and that the spreader conveyor can be utilized for receiving other discrete articles from a forming machine or the like for delivering them to and spreading them across a discharge conveyor. More specifically, however the utilization of a continuously operating shaft or the like in a patty or other article forming machine as one major drive element for the spreader conveyor is a feature of the present invention.

A typical patty machine suitable for utilization in the combination disclosed herein is shown and described in the patent to Felstehausen U.S. Pat. No. 3,424,294, Jan. 28, 1969, assigned to the FMC Corporation. These machines (FIGS. 1 and 2) have a hopper 10 with distributing paddles 12 which feed the meat to a pocket turret 14 having patty forming pockets 15. Mechanism not shown forms patties in the pockets 15 and as the turret 14 rotates, the patties are picked up by a rotating grill assembly 16 which has four pick heads 17 shown in FIG. 2. These pick heads lift patties from the pocket turret 14 and drop them onto a conveyor, such as the spreader conveyor S. Operation of the pick heads 17 is described in the patent to Felstehausen U.S. Pat. No. 3,460,191, Aug. 12, 1969, also assigned to the FMC Corporation.

As described in the aforesaid U.S. Pat. No. 3,424,294, the patty machine M has a continuously rotating shaft 18 (FIG. 1) which makes one rotation for each patty delivered from the machine. Under the present invention, the shaft 18 is utilized to drive the upper reach of the spreader conveyor belt in a manner to be described in detail presently.

The spreader conveyor S is run across the delivery side of the patty machine M and is supported on a wheeled stand shown at 20 in FIG. 2, which is secured to the patty machine. The spreader conveyor stand supports elongated tracks 22 which run beneath the pickhead turret 16 and terminate at one end over the discharge conveyor C. The ends of the tracks are bridged by cross plates 23,24.

The spreader conveyor includes an endless stainless steel wire belt B which is trained around a normally fixed length rigid frame 50 (FIG. 4) and the belt and frame reciprocate longitudinally along the tracks 22 during operation of the conveyor. The drive mechanisms for the spreader conveyor are disposed in a housing 26 (FIG. 2).

As previously mentioned, the upper reach of the conveyor belt B is continuously driven from the patty machine in the direction of the arrow on FIG. 1 and this drive incorporates a variable speed drive to adjust the speed of the spreader conveyor to the rate of delivery of the patties thereto from the patty machine M.

Figures 3, 4:
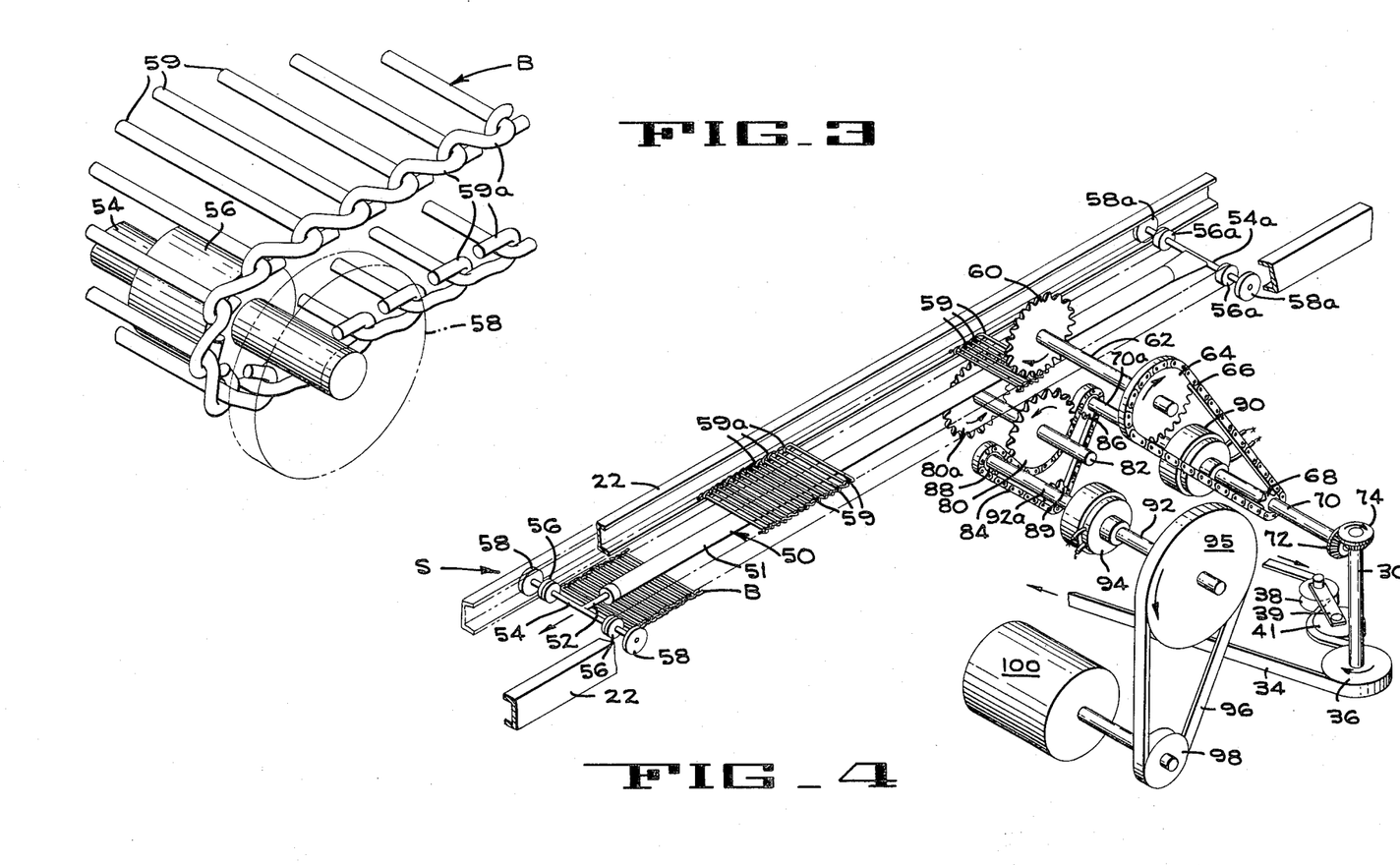
FIG. 3 is an enlarged fragmentary view showing details of the spreader conveyor.
FIG. 4 is a diagrammatic prespective of the drive mechanism for the spreader conveyor.

This continuous drive for the spreader conveyor includes a vertical shaft 30 (FIGS. 1 and 4) driven by the patty machine shaft 18 (FIG. 1), through an adjustable diameter pulley 32. As seen in FIG. 1B the pulley 32 is of the split half type with one pulley half being spring loaded (spring not shown) in a manner well known in the variable speed art so that increasing or decreasing the tension on belt 34 passing over the pulley changes the effective diameter of the pulley. In the present construction the aforesaid belt 34, is trained around a pulley 36 on the spreader conveyor shaft 30 (FIGS. 1, 1A and 4).

In order to adjust the speed of the spreader conveyor shaft 30 relative to the speed of the machine shaft 18, the tensioning mechanism shown in FIG. 1A is provided. This mechanism is simply an adjustable idler assembly that tensions the belt 34 for increasing or decreasing the effective diameter of the patty machine pulley 32, as mentioned. Thus, referring to FIG. 1A, the belt 34 from the patty machine shaft passes over an adjustable idler 38 mounted on an arm 39, which arm is pivoted at 40 to the spreader conveyor housing 26. A fixed idler 41 is on the pivot shaft 40 for the adjusting arm 39. In order to increase or decrease tension on the belt 34 for changing the speed ratio of the variable speed drive pulley 32, a hand screw 42 is threaded into a nut 44 formed on the upper end of the shaft for the adjustable idler 38. The hand screw 42 is mounted with a swivel connection 45 in the housing 26 and is operated by a hand crank 46 for swinging the idler 38 about the pivot 40 to increase or decrease the tension of the belt 34. Thus, a continuous variable speed drive is provided for the spreader conveyor shaft 30, which adjusts the spacing of patties on the belt B for any given rate of patty delivery.

As seen in FIGS. 1 and 2 a trip mechanism T is mounted adjacent the delivery end of the spreader conveyor which mechanism is tripped to end the advance stroke of the conveyor S and is cocked at the end of the retract stroke. A cocking mechanism T1 is mounted at the rear end of the tracks 22 for ending the retract stroke and initiating a new advance stroke of the spreader conveyor. The cocking mechanism T1 operates the trip mechanism T through a square shaft 48, and in order to adjust the limits of the spreader conveyor reciprocation, the mechanisms T, T1 are both adjustably mounted along the shaft 48, as will be described in detail presently.

Spreader Conveyor Frame

Figure 14:
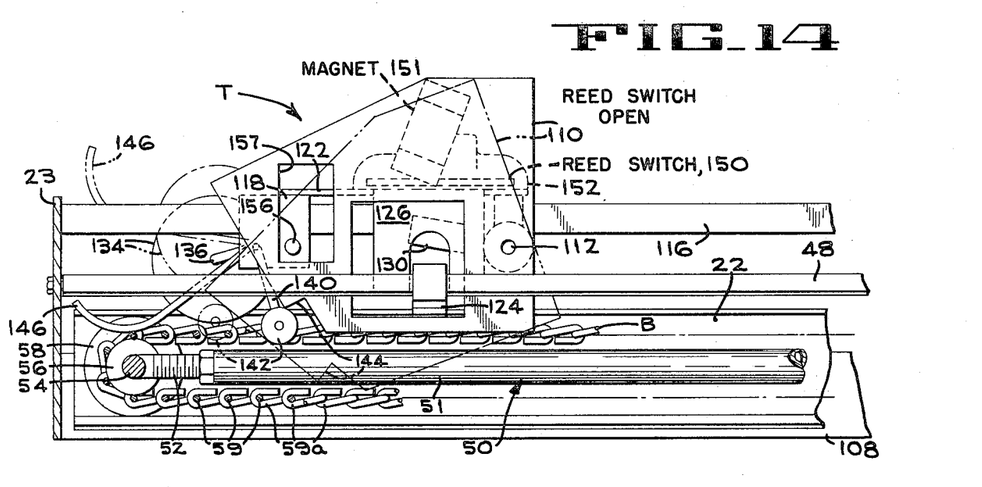
FIG. 14 illustrates actuation of the trip mechanism for retracting the spreader conveyor when no patty is present.

The spreader conveyor belt B is an endless belt that is trained around rollers at opposite ends of an adjustable length, rigid frame previously mentioned and indicated generally at 50, and seen complete in FIG. 4. The frame 50 includes a central, longitudinal extending backbone or spacer rod 51, having an adjustable delivery end rod 52 (FIG. 14). The delivery end of the frame mounts a cross shaft 54 carrying rollers 56 for the conveyor belt B (see also FIG. 3). The shaft 54 also mounts a pair of wheels 58 that ride in the tracks 22, the latter being in the form of channel sections for this purpose (see also FIG. 11).

As seen in FIG. 4, the rear end of the frame 50 has a cross shaft 54a conveyor belt rollers 56a, and track wheels 58a. With this construction, not only can the belt B be independently driven around the end rollers 56,56a but the entire belt and frame assembly can be reciprocated in the tracks 22 without need for take up mechanism or lost motion devices for the conveyor belt B. As seen in FIG. 3, the belt B is formed of stainless steel cross rods 59, linked together at 59a.

Spreader Conveyor Drive Unit

As previously outlined briefly, the spreader conveyor drive mechanism of the present invention has two modes of operation. The first mode is advance of the spreader conveyor during loading. While the conveyor is advancing across the discharge conveyor C before depositing a row of patties on the latter, both the upper and lower reaches of the spreader conveyor belt B are advanced simultaneously and at the same speed, with which both the entire conveyor belt B and the frame 50 advance across the discharge conveyor C.

The second mode is retraction, for depositing patties on the discharge conveyor. In this mode, the lower reach of the spreader conveyor belt B is driven in the opposite direction and at a higher speed than before. Now, although the conveyor belt B continues to run around the frame 50 as before, so that the upper reach can continue to receive patties, the frame itself is retracted, leaving a row of patties behind on the discharge conveyor C.

Figure 5:
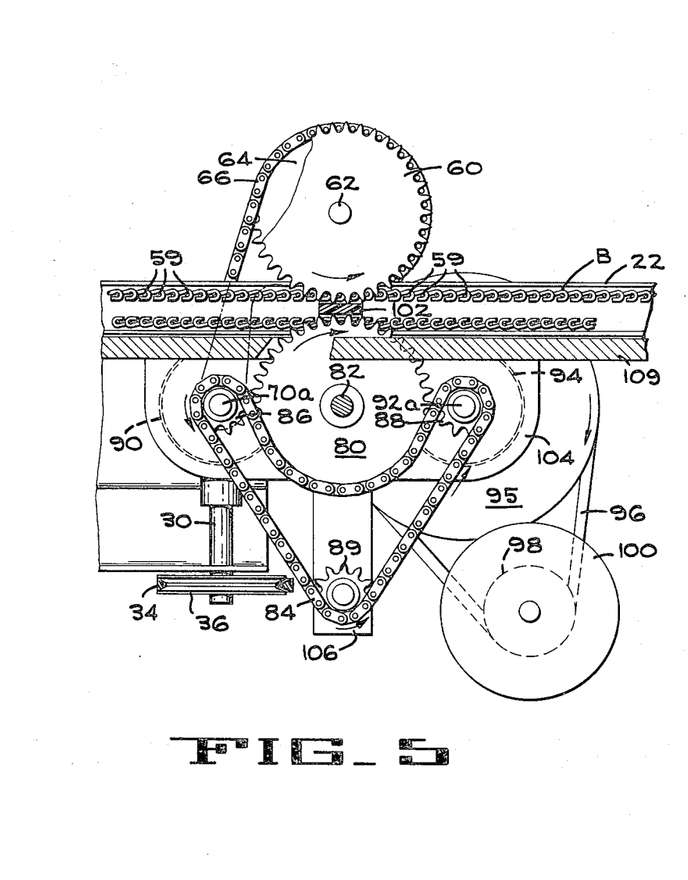
FIG. 5 is an enlarged section showing the drive mechansim taken as indicated on line 5—5 of FIG. 1.
Figure 6:
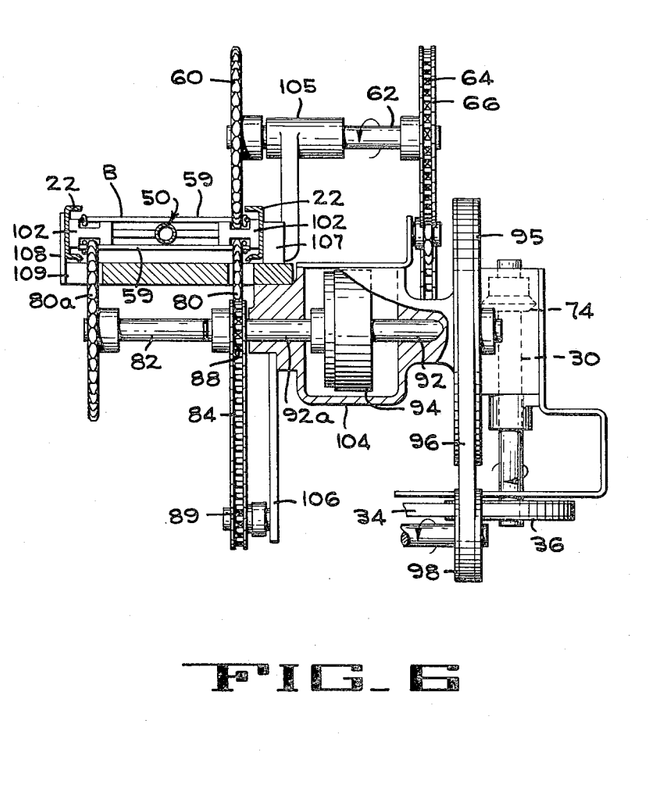
FIG. 6 is a section through the drive mechanism taken as indicated on line 6—6 of FIG. 1.

In accordance with the present invention, this dual mode of reciprocation of the spreader conveyor is accomplished by rotary mechanism without requiring cams or reciprocating devices and control is provided by a pair of electro-magnetic clutches and a reed switch. FIG. 4 is a perspective diagram of the spreader conveyor advancing and retracting mechanism and FIGS. 5 and 6 show various construction details. However, it is to be understood that the exact manner in which various shafts and parts are supported in housing and frame elements is a matter of design not critical to the invention and hence these design elements are not exhaustively illustrated and described.

Referring principally to FIGS. 4 – 6, the upper reach of the conveyor belt B is continuously driven in the advance direction by an upper sprocket 60 that meshes with the cross rods 59 forming the belt. The upper sprocket 60 is on a shaft 62, the outer end of which carries a sprocket 64 driven by a chain 66 and a small sprocket 68 on a continuously driven shaft 70. The outer end of the shaft 70 mounts a bevel gear 72 meshed with a bevel gear 74 on the upper end of the vertical shaft 30 previously described. It will be recalled that the shaft 30 is continuously driven by a variable speed drive mechanism (FIG. 1A) from a patty machine shaft 18 (FIG. 1), such as the shaft 60 shown in FIG. 2 of the aforesaid Felstehausen U.S. Pat. No. 3,424,294. Also, and as mentioned, the patty machine shaft 18 makes one revolution for each patty delivered.

The lower reach of the belt B is selectively driven in opposite directions and at different speeds by a pair of reversible sprockets 80,80a that mesh with the rods 59 on the lower reach of the conveyor belt B, (see also FIG. 6). The sprockets 80,80a are on a shaft 82 which is supported for free rotation in the framework of the conveyor. The outer sprocket 80 is driven in either direction by a chain 84 that embraces the lower half of the sprocket 80 and passes over a small advancing sprocket 86 and a small retracting sprocket 88, as well as over an idler 89.

The advancing sprocket 86 is driven by a shaft 70a that is concentric with the continuously driven shaft 70 and which can be selectively coupled to the shaft 70 by an electromagnetic advance clutch 90.

The retract sprocket 88, also meshed with the chain 84, is driven by a shaft 92a that is connected to a retract electromagnetic clutch 94. The clutch 94 is continuously driven by a shaft 92, a large V-belt pulley 95, V-belt 96, a motor pulley 98 and an electric motor 100. The motor 100 runs continuously during operation of the spreader conveyor. As will be seen, the clutches 90,94 are alternately engaged by a magnet and reed switch control circuit for advance and retraction of the spreader conveyor.

A few other features of the drive mechanism appear in FIGS. 5 and 6. For example, where the sprockets 60, and 80,80a drive the belt B, the belt is backed up by notched guide blocks 102 fixed within the side channels 22. The clutches 90,94 are supported in a frame or housing structure 104 (FIG. 6) which also mounts the vertical shaft 30 and other shafts, such as the central shaft 82 and the clutch shafts. The upper sprocket shaft 62 is supported in a housing bracket 105 (FIG. 6) and the idler 89 for the chain 84 is supported on a depending bracket 106. The track channels 22 for the conveyor are secured to longitudinal extending rigid frames 107,108 which are mounted on a main frame plate 109, which plate is relieved to clear various sprockets and chains as required. The electromagnetic clutches 90,94 are spring opened (at which time their output shafts are free) and when energized are engaged to couple the two shafts to which they are connected. Clutches suitable for this application are the style SMR, Direct Current Operated Clutches, manufactured by the Stearns Electric Corporation of Milwaukee, Wisconsin.

Operation of the Drive Unit

Figure 7:
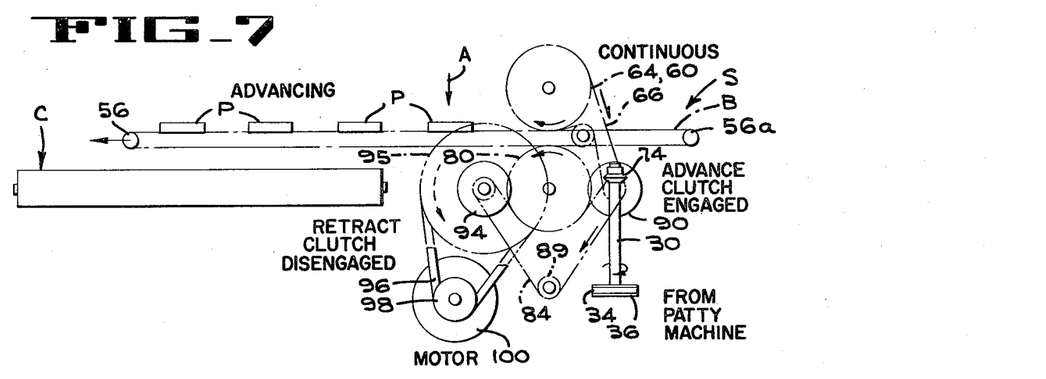
FIGS. 7 and 8 are schematic diagrams showing the drives during advance and retraction of the spreader conveyor.

FIG. 7 is a diagram illustrating the operation of the drive unit when it is advancing the spreader conveyor over the discharge conveyor C. It will be assumed that patties are being dropped onto the spreader conveyor as indicated by the arrow A and that the drive from the patty machine is adjusted so that the patties are properly spaced along the upper reach of the belt B.

As previously mentioned, the pulley 36 is driven from the patty machine and hence the shaft 30 continuously rotates. By means of the mechanism just described (see FIG. 4), this rotates the upper belt sprocket 60 in a direction which moves the upper reach of the conveyor belt B in the advance direction. During the advancing operation the advance clutch 90 will be energized, thereby coupling the shaft 70a to the continuously driven shaft 70 (see FIG. 4) to drive the chain 84 by the advance sprocket 86. This motion of the chain 84 is indicated by an arrow in FIG. 7, and turns the lower sprockets 80,80a (only sprocket 80 appears in the diagram of FIG. 7) in a direction to move the lower reach of the belt B in the same direction and at the same speed as that imparted to the upper reach of the belt B by the continuously rotating sprocket 60. During this time the retract clutch 94 will be de-energized by the electrical control, and hence is disengaged, so that its output shaft runs free.

Figure 8:
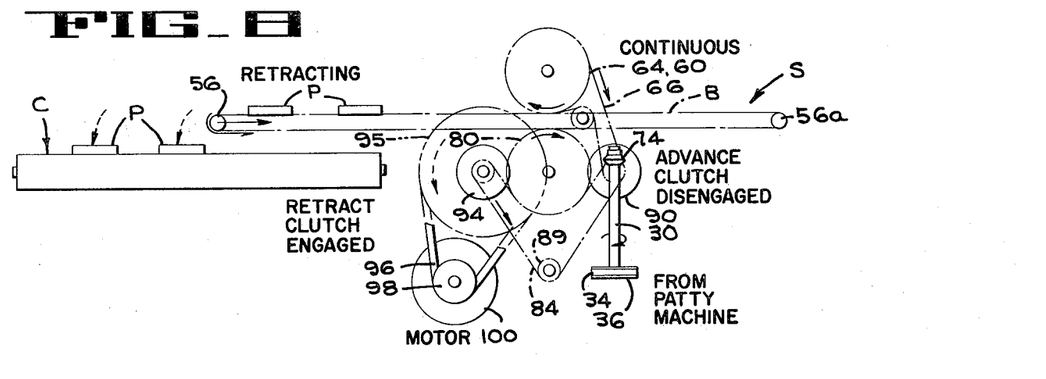

With the sprockets 60,80 and 80a turning in the direction shown on FIG. 7 and at the same speed, both the upper and lower reaches of belt B are advanced uniformly and in the same direction, there being no motion of the belt B relative to the frame 50. This pulls the frame 50 for the spreader conveyor (via the rear pulleys 56a) in the advancing direction as indicated in FIG. 7. This results in loading the upper reach of the conveyor belt B with a series of spaced patties P as the delivery end of the spreader conveyor traverses the discharge conveyor C. At the end of the advance stroke, the spreader conveyor S is rapidly retracted for depositing the row of patties on the discharge conveyor C. This operation is shown in the diagram of FIG. 8 and it will be noticed that the continuously driven upper sprocket 60 is still moving the upper reach of the belt B in the advance direction as before, so that regardless of what happens to the frame of the conveyor and to the lower reach of the belt B, the upper reach of the belt moves beneath the patty machine M and hence can receive the periodically dropped patties, as indicated by the arrow A, during the retract operation, and these patties will be at the same spacing on the upper reach of the belt B as before.

In order to retract the spreader conveyor S, the advance clutch 90 is disengaged (de-energized) and the retract clutch 94 is engaged. Engagement of the clutch 94 couples the shaft 92 (continuously driven by the large pulley 95, V-belt 92 (continuously driven by the large pulley 95, V-belt 96 and the motor 100) to the output clutch shaft 92a, which now drives the small retract sprocket 88. However, the sprocket 88 reverses the direction of the chain 84 and as a result, the lower belt drive sprockets 80,80a are also driven in the reverse direction and at a speed that is about three times or more higher than the speed of the continuously driven upper sprocket 60 that continues to advance the upper reach of the belt B. When reversed, the lower sprockets 80,80a drive the lower reach of the belt in the opposite direction relative to the frame 50 as that imparted to the upper reach of the belt by the upper sprocket 60, and at a much higher speed. As a result of this differential speed drive to the two reaches of the belt B, the belt and frame assembly are rapidly retracted by pulling on the front pulleys 56. This retraction, in conjunction with the relatively slow but continuous advance motion of the upper reach of the belt B, results in depositing a row of patties across the width of the discharge conveyor C. The manner in which the conveyor retract stroke is terminated, and a new advance stroke initiated will be described after the control elements have been explained in detail.

Trip Control Elements

As previously mentioned and as seen in FIGS. 1 and 2, the control system includes the forward trip mechanism T which engages the retract clutch 94 when the spreader conveyor has been fully advanced. Retract action is initiated by the sensing of a patty at the delivery end of the spreader conveyor, or in case no patty has been positioned at that zone of the conveyor, by sensing the full advance of the conveyor directly. The retracted spreader conveyor is advanced by the cocking mechanism T1 at the rear end of the framework which mechanism cocks the trip mechanism T to engage the advance clutch 90 and begin a new advancing stroke of the spreader conveyor.

Figure 9:
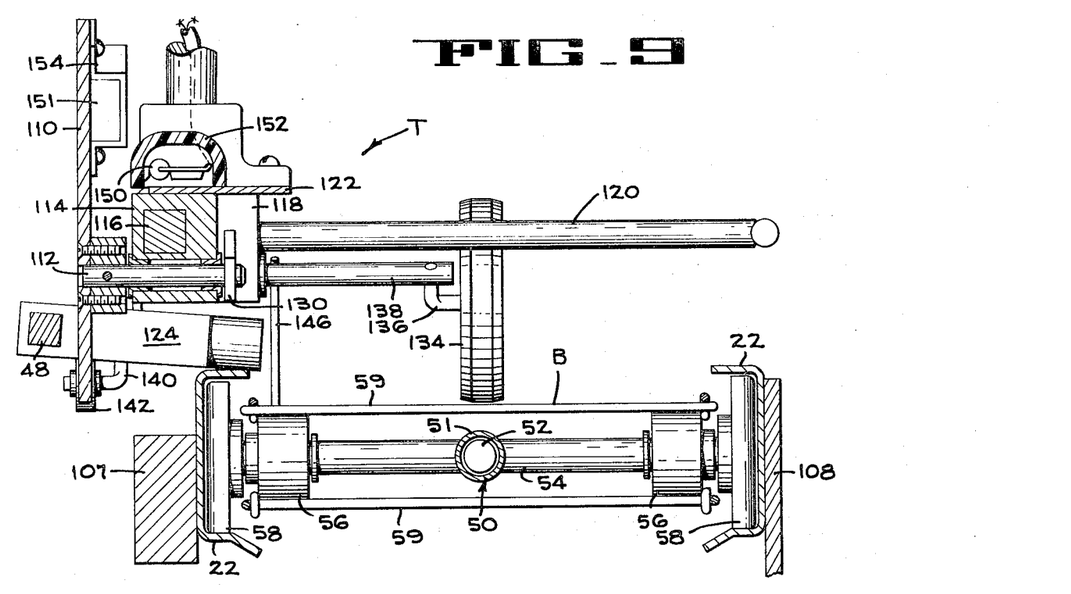
FIG. 9 is a section through the trip mechanism at the delivery end of the conveyor that controls the advance and retract of the spreader conveyor and taken as indicated on line 9—9 of FIG. 10.

The trip mechanism T includes a pivoted trip plate 110 (FIGS. 9, 19, 11 and 14) that is pinned to a pivot shaft 112 (FIG. 9) that is freely rotatable in a rear support block 114.

The rear block 114 is slideably supported along a longitudinally extending square bar 116 secured to the end cross plate 23 of the spreader conveyor framework at one end (FIGS. 2 and 10) and to a bracket 23a (FIG. 2) at its other end.

Figures 10, 10A:
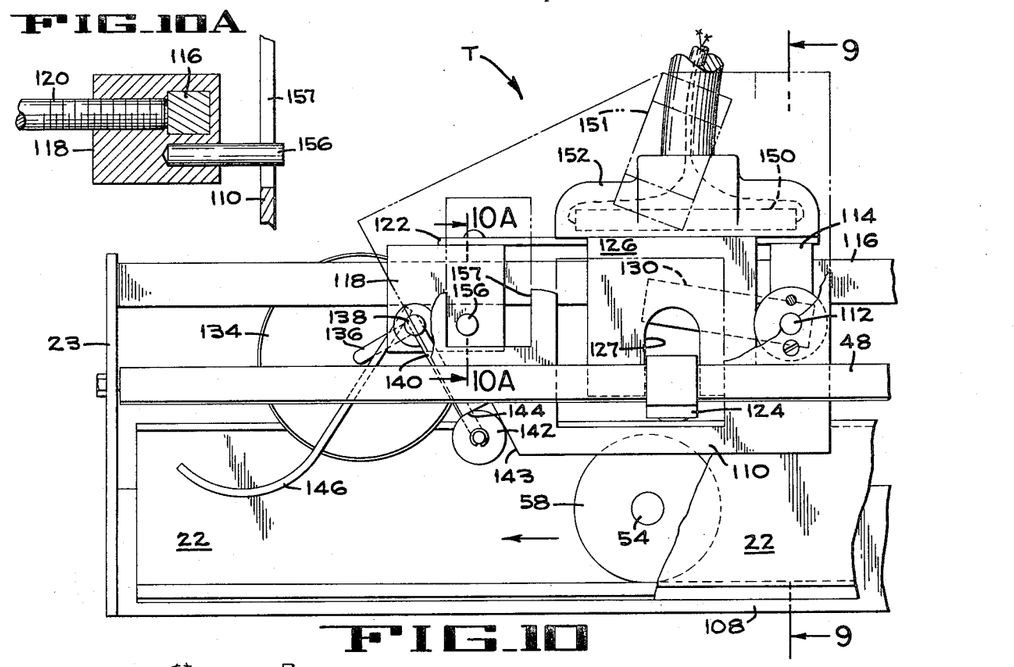
FIG. 10 is an enlarged side view of the trip mechanism.
FIG. 10A is a section taken as indicated on line 10A—10A of FIG. 10.
Figures 11, 11A:
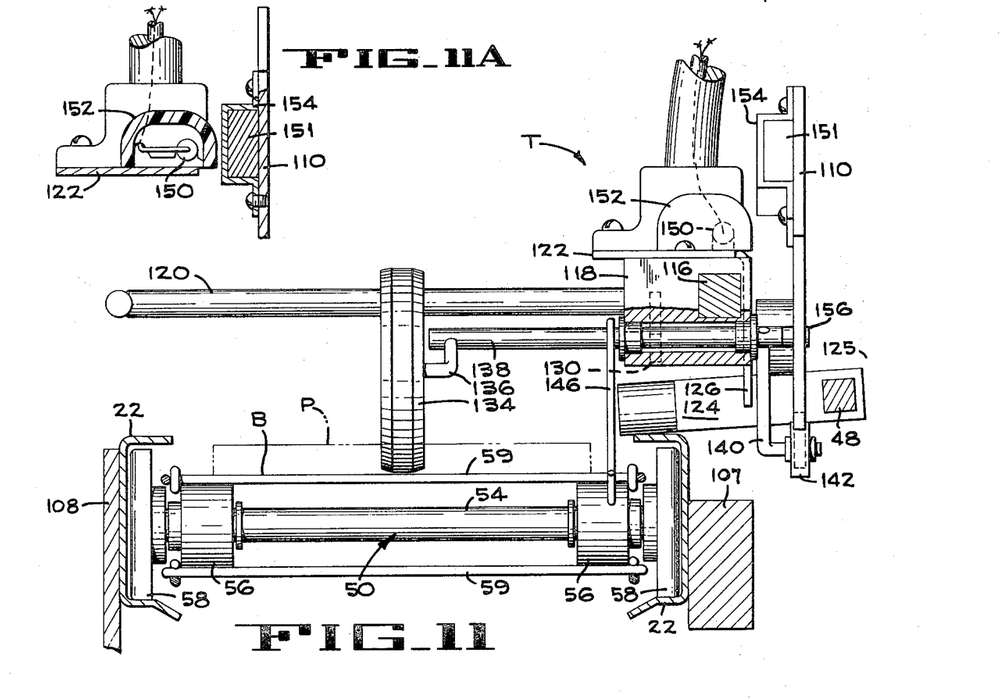
FIG. 11 is an end view of the trip mechanism at the discharge end of the spreader conveyor.
FIG. 11A is a detail showing the read switch operating magnet in position for closing the read switch.

The patty and the conveyor end sensing devices are supported on a front block 118 (FIGS. 10 and 11) that is also slideably mounted along the square bar 116 and which can be clamped in any position along the bar by a threaded T handle 120 as shown in FIG. 10A, and which also appears in FIGS. 1 and 11.

The slideable blocks 114,118 are connected by a bridge plate 122 (FIG. 10) so that when the T handle 120 is loosened and the forward block 118 is slid along the square bar 116, the rear block 114 and hence the pivoted trip plate 110 all move together. This permits adjustment of the termination zone for the advance stroke of the spreader conveyor.

A trip plate cocking finger 124 (FIGS. 10 and 11) is slidably mounted on the square shaft 48, and when the block 118 (and hence the trip plate) are adjusted along the square bar 116, the cocking finger 124 also slides along the square shaft 48. This motion of the cocking finger 124 is provided by a plate 126 that depends from the bridge plate 122 and is notched at 127 to embrace the cocking finger 124 (FIG. 10). The function of the cocking finger 124, which has a rounded end, is to lift a cocking lever 120 best seen in FIGS. 9 and 10, which cocks the trip plate 110. The cocking lever 130 is secured to the pivot shaft 112 that pivotally mounts the trip plate 110 in the rear sliding block 114, as previously described. As will be seen, the cocking finger 124 is rotated to lift or cock the trip plate 110 upon rotation of the square shaft 48 in response to actuation of the cocking mechanism T1 at the rear end of the conveyor.

In accordance with the present invention, the end of the advance stroke of the spreader conveyor is normally signified by the sensing of a patty P at the discharge end of that conveyor, when the conveyor has reached a predetermined position in its advance stroke.

The sensing of the patty is accomplished by a lightweight sensing wheel 134 (FIG. 12) that is just low enough to be lifted by the patty without marring it. The wheel 134 is formed of a plastic such as nylon or the like, and is rotatably supported by a bent arm 136, (FIGS. 10 and 11) that projects forwardly and downwardly from the inner end of a pivot rod 138. The outer end of the pivot rod 138 mounts a downwardly extending trip rod 140, the lower end of which mounts a small trip roller or wheel 142. The trip plate 110 is notched at 143 to form a keeper shoulder 144 (FIG. 10), and when the trip plate is in its uppermost or cocked position, the shoulder 144 rests on the small wheel 142, which thus supports the plate 110 in the position shown in FIG. 10. It will be noted that in the cocked position of FIG. 10, the patty sensing wheel 134 is in its lower position, but as shown in FIG. 11 the wheel 134 is not low enough to engage the upper surface of the belt B but is lower than the upper surface of a patty P resting on the belt.

As shown in FIG. 10, the keeper shoulder 144 is substantially perpendicular to the trip wheel rod 140 and thus presents little resistance to motion of the small wheel 142 out from under the shoulder 144 in response to lifting of the patty sensing wheel 134 by a patty P at the end of the advance stroke. This construction accommodates operation of the sensing wheel 134 by patties at the end of the advance stroke without marking, damage or visible effects on the patties.

In order to retract the conveyor in case no patty is present at the end of the advance stroke, a no-patty trip finger 146 (FIGS. 10 and 14) is secured to the pivot rod 138 of the sensing wheel 134 and depends downwardly in a manner which interferes with advance of the belt B past the end of the advance stroke. When the conveyor cams up the no-patty trip finger 146, the trip wheel 142 is lifted clear of the shoulder 144 for dropping the trip plate 110 and initiating the retract stroke.

Clutch Control Elements

Figure 12:
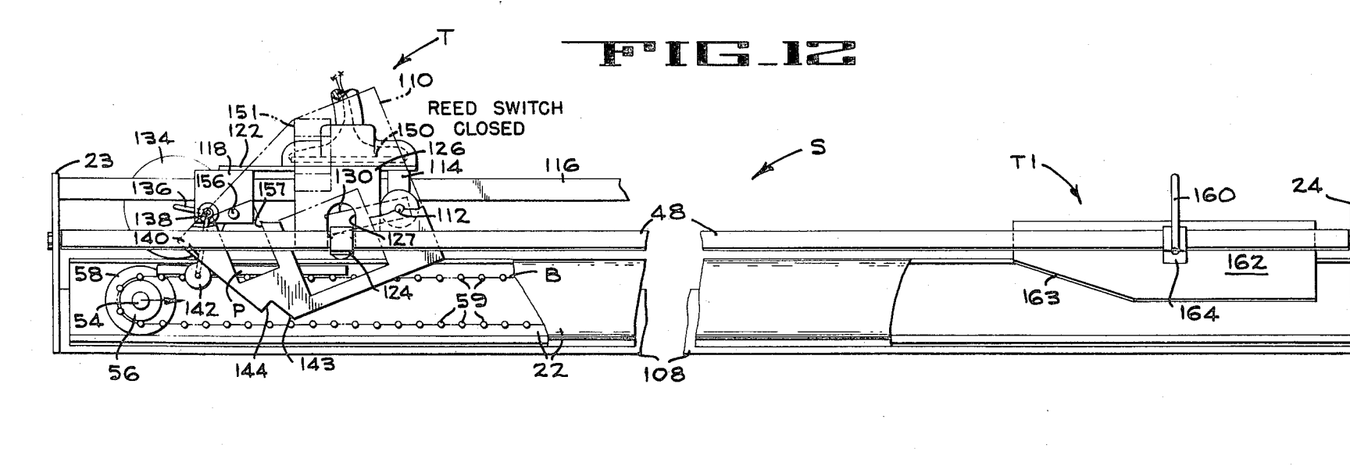
FIG. 12 shows actuation of the trip mechanism by a patty sensing wheel at the end of the advance stroke of the spreader conveyor.

As previously mentioned, the control of the drives includes electromagnetic clutches 90,94 and a circuit to be described presently. These clutches are controlled by the operation of a read switch 150 (FIGS. 10–11A) which in turn is closed and permitted to spring open again by the action of a magnet 151 mounted on the trip plate 110. The read switch 150 is mounted within a plastic housing 152 which housing is secured to the bridge plate 122, as best seen in FIGS. 10 and 11. The read switch 150 is closed by a magnet 151 mounted in a bracket 154 on the trip plate 110 and positioned in front of the read switch as seen in FIGS. 11A and 12. The condition in FIGS. 11A and 12 represent the tripped position of the trip plate 110, and initiates the retract stroke of the conveyor.

When the trip plate 110 is in its cocked position shown in FIGS. 10, 11 and 14, the magnet 151 is swung up and away from the read switch 150 to a position wherein it can no longer close the switch, thereby permitting the switch contacts to spring open in the usual manner. As seen in FIG. 12, in order to prevent complete drop away of the trip plate 110, a stop pin 156 projects from the front block 118 through an aperture 157 in the plate and as also can be seen in FIG. 12, the upper boundary of the aperture 157 rests upon the pin 156 when the trip wheel 142 has been lifted out from under the keeper shoulder 144 of the plate.

Cocking Mechanism

The construction of the cocking mechanism T1 (FIG. 2) which cocks the trip plate 110 after it has been released by the patty sensing wheel and associated mechanism is shown in FIGS. 12, 13, 15 and 16. As previously mentioned, this cocking mechanism T1 is mounted on the square shaft 48 and its position along that shaft is adjustable, the mechanism being clamped in a selected position by a threaded T handle 160 shown broken away in FIGS. 15 and 16 but shown complete in FIGS. 1 and 2.

This adjustment determines the position wherein the retract stroke of the spreader conveyor ends and a new advance stroke is initiated.

Figure 13:
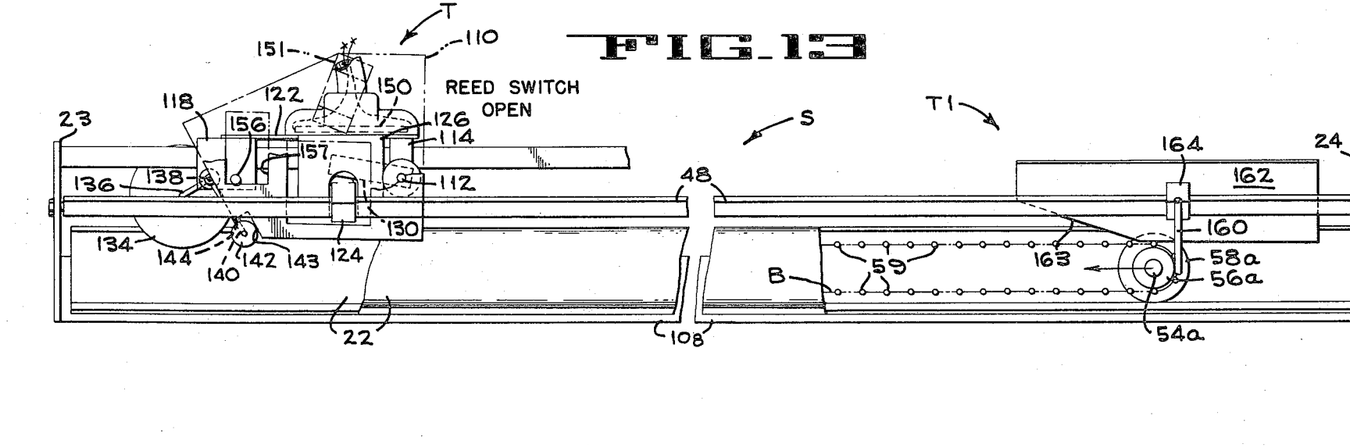
FIG. 13 shows cocking of the trip mechanism at the end of the retract stroke of the spreader conveyor.
Figure 15:
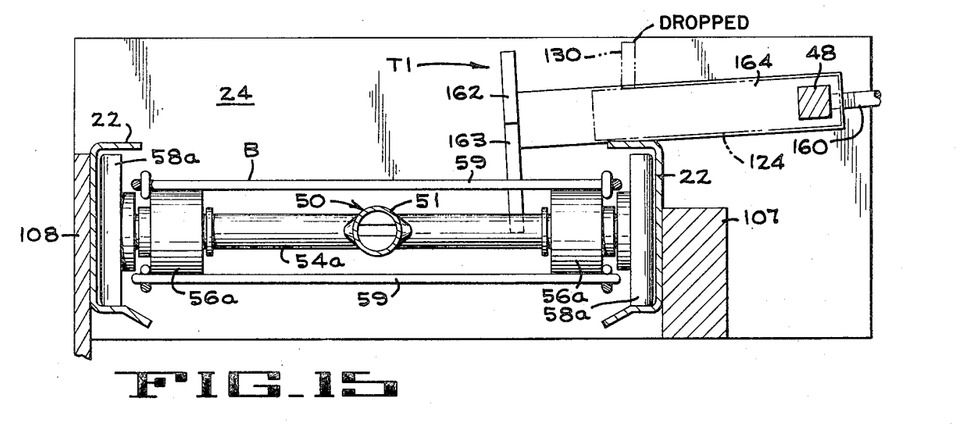
FIG. 15 shows the reset or cocking cam mechanism for initiating advance stroke of the spreader conveyor when the trip mechanism has been actuated or dropped. Compare with FIG. 12.
Figure 16:
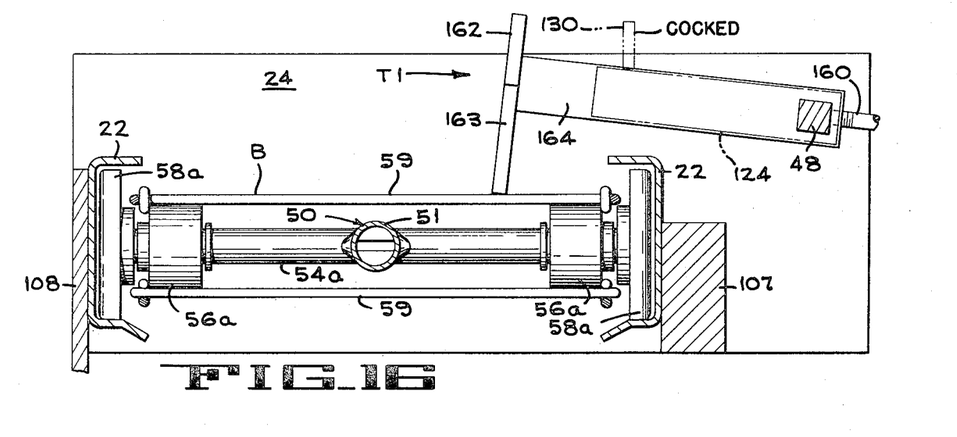
FIG. 16 is a similar view showing the reset or cocking cam mechanism after completion of a retract stroke of the spreader conveyor. Compare with FIG. 13.

The cocking mechanism T1 includes a cam 162 with a beveled undersurface 163 for receiving the rear end of the spreader conveyor near the end of the retract stroke (FIGS. 13 and 16). This lifts the cam 162 from the positions of FIGS. 12 and 15 to that of FIG. 16. The cam 162 is mounted on an arm 164 (FIG. 15), which, as previously mentioned is adjustably positioned along the square shaft 48. It can thus be seen that lifting of the cam 162 by the rear end of the spreader conveyor will lift the arm 164 and hence will rotate the square shaft 48.

The effect of this rotation of square shaft 48 is to lift the front cocking finger 124, and hence the front cocking lever 130 connected to the trip plate 110 (see FIG. 13). The front cocking finger 124 and the cocking lever 130 on the trip plate 110 are shown in phantom in FIGS. 15 and 16 for orientation and explanation. Lifting of the cocking lever 130 by the aforesaid rotation of the square shaft 48 at the end of a retract stroke, cocks the trip plate 110 high enough so that as seen in FIG. 13 the small trip wheel 142 can fall under the keeper shoulder 144 on the trip plate 110 and thereafter hold the plate up in its cocked position. The reed switch 150 is now open and a new advance stroke begins.

However, when a patty P trips the patty sensing wheel 134 (FIG. 12) and the trip plate 110 drops as shown in that figure, the cocking lever 130 will drop onto the cocking finger 124, which condition is shown in phantom in FIG. 15. The no-patty finger 146 can produce the same effect (FIG. 14). This starts a retract stroke, as previously described.

As stated above, when the spreader conveyor has again fully retracted as shown in FIG. 13, the cocking cam 162 is lifted by the conveyor, which rotates the square shaft 48 so as to again lift the cocking finger 124, which lifts the cocking lever 130 (FIG. 16) connected to the pivot shaft 112 for the trip plate (FIG. 13), to thereby lift and re-cock the trip plate 110 for a new advance stroke. Thus the spreader conveyor oscillates back and forth under control of the trip mechanism T and the patty sensing wheel 134 at one end, and the mechanical cocking mechanism T1 at the other end, with the position of the magnet 151 relative to the reed switch 150 actuating the control for the drive mechanism.

Control Circuit

Figure 17:
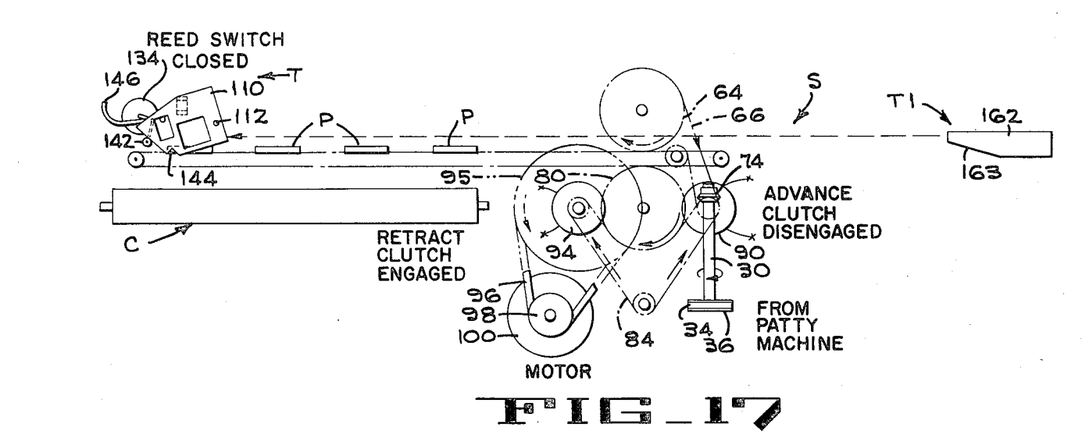
FIG. 17 is a schematic diagram showing operation of the trip mechanism for initiating a retract stroke.
Figure 18:
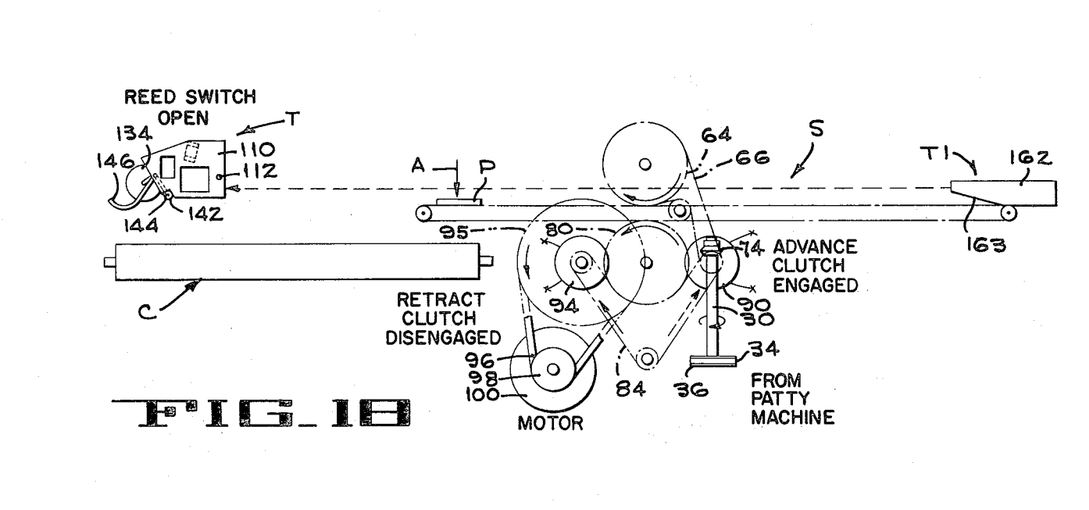
FIG. 18 is a diagram like that of FIG. 17 showing the reset or cocking mechanism being actuated at the end of the retract stroke.
Figure 18A:
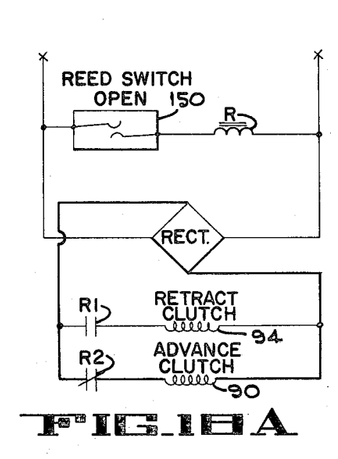
FIG. 18A is a corresponding electrical diagram.

The control circuit performing the operations just described is illustrated in FIGS. 17 - 18A. In FIG. 17, the advance stroke of the conveyor is completed and a patty P has been advanced under the sensing wheel 134. This swings the small wheel 142 out from under the keeper shoulder 144 on the plate 110 and the latter drops about its pivot 112 from the position of FIG. 10 to that of FIG. 12. The same action is initiated by the no-patty trip finger 146 (FIG. 14), phantom line position of FIG. 12.

Figure 17A:
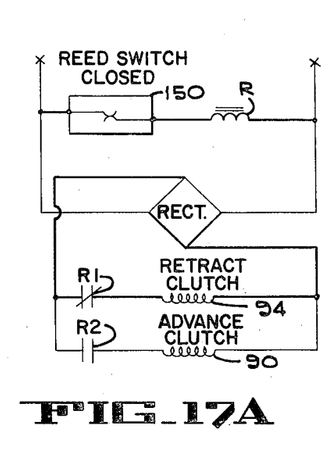
FIG. 17A is a corresponding electrical diagram.

In the tripped position of the trip plate, and as shown in FIG. 12, magnet 151 is moved in front of the reed switch 150 (see FIG. 11A) which closes the reed switch. As seen in the circuit diagram of FIG. 17A, when the reed switch is closed, a relay R is energized from the A.C. supply line. The supply line is also connected to a rectifier for supplying direct current to the clutches 90, 94. Thus as seen in FIG. 17A, when the relay R is energized by the closing of the reed switch, a normally open relay contact R1 is closed and the retract clutch 94 is energized. This initiates the retract stroke of the spreader conveyor with attendant depositing of a row of patties onto the discharge conveyor 30, as previously described.

A normally closed relay contact R2 is opened when the relay R is energized, thereby de-energizing the advance clutch 90 which would otherwise stall the retract stroke drive from the motor 100 and associated apparatus previously described.

At the end of the retract stroke and as indicated in FIG. 18, the rear end of the spreader conveyor lifts the cam plate 162 of the cocking apparatus T1 (see FIG. 15). As previously described and as seen in FIG. 13, this rotates the square shaft 48, lifts the cocking finger 124, which lifts the cocking lever 130 and hence lifts the trip plate 110, to cock the plate. With the plate thus cocked, the magnet 151 now clears the read switch 150 so that the switch opens, as indicated in the circuit diagram of FIG. 18A. The relay R is now de-energized so that the normally open contact R1 (which had formerly energized the retract clutch) 94 now opens. Simultaneously, the normally closed relay contact R2, connected to the advance clutch 90, is permitted to close. This energizes the advance clutch and causes it to engage, thereby initiating a new advance stroke of the spreader conveyor.

As previously described, the limits for the advance and retract stroke are set by adjustment of the tripping apparatus T and the cocking apparatus T1 at opposite ends of the conveyor frame. Although the control mechanism of the present invention is normally operated in response to the presence of a patty at the discharge end of the spreader conveyor, no damage will occur to the machine and the retract stroke will be initiated at substantially the normal conveyor position, because of the no-patty sensing finger 146.

Patty Handling

Figure 19:
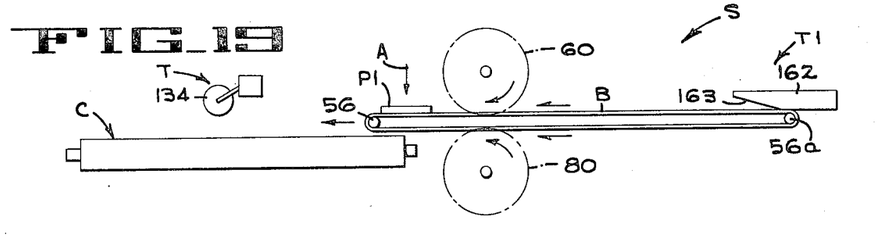
FIGS. 19 – 23 are diagrammatic views illustrating the spreader conveyor being loaded from the patty machine and how it discharges a row of patties upon retraction.
Figure 20:
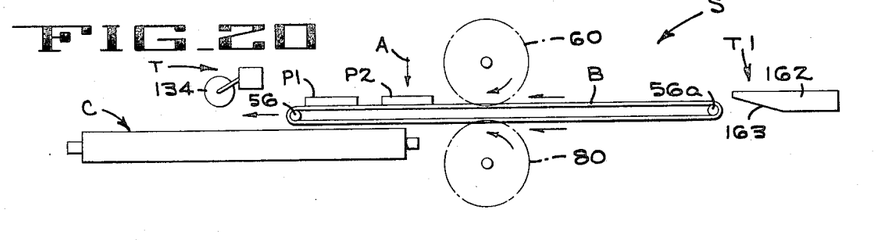
Figure 21:
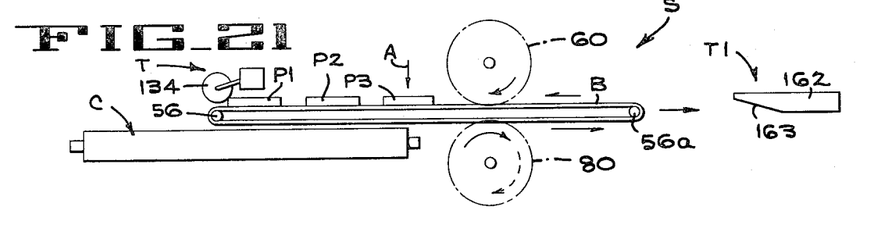

FIGS. 19 - 21 are highly simplified diagrams showing how patties are handled by the spreader conveyor of the present invention. For simplicity, it will be assumed that there are only three patties in a row, actually the row usually contains more patties.

In FIG. 19 a patty P1 has been dropped onto the discharge end of the spreader conveyor from the patty machine in a manner previously described, and as indicated by the arrow A. The cocking mechanism T1 at the rear of the spreader conveyor has initiated an advance stroke and the sprockets 60 and 80 are rotating in opposite directions and at the same speed to advance the spreader conveyor S across the discharge conveyor C.

In FIG. 20 a second patty P2 has been dropped onto the spreader conveyor, and as previously described, the adjustable drive between the patty machine shaft and the spreader conveyor mechanism (see FIG. 1A), makes possible the selection of the spacing of the patties along the conveyor belt B. The cocking mechanism T1 has dropped down but has recocked the trip plate 110 to the position of FIG. 10 so that the reed switch 150 is opened and the conditions of FIGS. 18 and 18A are present, thereby continuing the advance stroke.

In FIG. 21, a third patty P3 has been dropped onto the spreader conveyor since this completes the row, the first patty P1 has lifted the patty sensing wheel 134 which is the condition illustrated in FIG. 12. This releases the trip plate 110 which drops to the position shown in FIG. 12, thereby closing the reed switch, and initiating a retract stroke by energizing the retract clutch. The lower sprocket 80 is now reversed and is driven at a speed higher than that of the upper sprocket 60. Thus, although the upper reach of the conveyor B is being advanced by the upper sprocket 60 relative to the frame 50 and the patty machine M, so that patties can continuously fall thereon from the patty machine, the conveyor frame itself is rapidly retracted.

Figure 22:
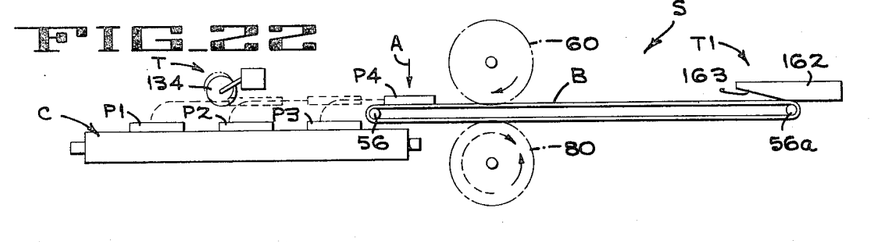

As seen in FIG. 22, this rapid retraction, coupled with the continued advance of the upper reach of the belt B, causes the patties P1, P2 and P3 to successively be projected forwardly clear of the spreader conveyor, whereupon they drop in a curved path onto the discharge conveyor C. The patty spacing on the discharge conveyor C will be greater than that on belt B. In FIG. 22 the retract stroke has terminated and a patty P4 has been dropped onto the conveyor belt B from the patty machine. However, the rear of the conveyor belt B has lifted the cocking mechanism T1, which again cocks the trip plate 110 to the position of FIG. 13 for resetting and for opening the reed switch 150. When the reed switch 150 is opened, the conditions of FIG. 18 and 18A are restored, whereupon the next advance stroke is initiated with the first patty P4 of the next row on the discharge end of the spreader conveyor belt B.

Figure 23:
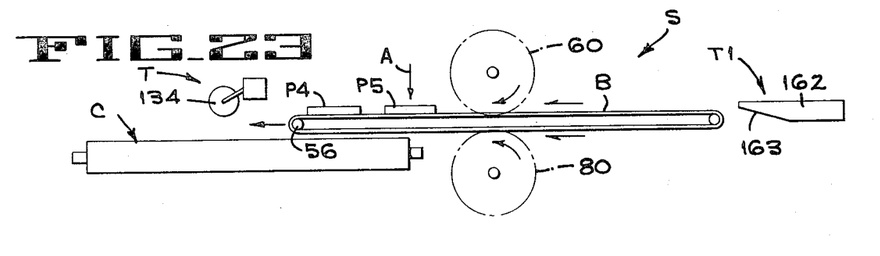

FIG. 23 shows an intermediate position of the second advance stroke with a patty P5 having deposited behind the patty P4 on the conveyor belt B.

As mentioned, the above diagrams only show the formation of a three patty row for simplicity, but it should be understood that in actual practice rows of patties should include more than three patties or less.

In a typical installation, a row of five patties having a diameter of about 4 ½ inches, will be deposited on the belt B at a center to center distance of about 5 ½ inches. The belt B will be driven by the upper sprocket 60 at about 13.75 inches/sec. when the patty machine is delivering 100 patties/min. The belt B and the frame 50 will be retracted by the differential drive between sprockets 60 and 80 at about 38 inches/sec. Of course this example represents only one setting of the variable speed drive between the patty machine and the spreader conveyor.

The spreader conveyor of the present invention has been described as connected to a continuously driven shaft of a patty machine or other article dispenser. However, in certain installations the spreader conveyor can be made as a self contained unit, employing a variable speed motor drive for the mechanism that continuously drives the sprockets for the upper reach of the spreader conveyor belt.

Although the best mode contemplated for carrying out the present invention has been herein shown and described it will be apparent that modification and variation may be made without departing from what is regarded to be the subject matter of the invention.

What I claim is:

1. Spreader conveyor apparatus of the type comprising an endless spreader conveyor belt, a discharge conveyor running laterally beneath the delivery end of said spreader conveyor belt, article supply means for depositing articles on the upper reach of said spreader conveyor, and drive means for advancing and retracting the delivery end of said spreader conveyor belt across the discharge conveyor; the improvement comprising laterally spaced tracks extending laterally of said discharge conveyor, a fixed length, shiftable spreader conveyor frame, means mounting said spreader conveyor frame for reciprocation in said tracks, means mounting said spreader conveyor belt for travel around said frame, said spreader conveyor drive means comprising means for continuously driving the upper reach of said spreader conveyor belt in the advance direction, reversible means for driving the lower reach of said spreader conveyor belt, means for operating said reversible drive means in the same direction and at substantially the same speed as said continuous drive means for advancing both reaches of said spreader conveyor belt and the frame across said discharge conveyor while said spreader conveyor is receiving a row of articles, and means for operating said reversible drive means in the opposite direction and at a speed higher than that of said continuous drive means for quickly retracting both the spreader conveyor frame and the delivery end of the belt to deposit a row of articles from the spreader conveyor to the discharge conveyor while said continuous drive means advances the upper reach of said spreader conveyor belt relative to the frame for receiving articles from said supply means.

2. The apparatus of claim 1, wherein said article supply means comprises a patty forming machine having a continuously driven shaft, a variable speed drive between said patty machine shaft and said continuous drive means for the upper reach of said conveyor belt, clutch means engageable for driving said reversible conveyor drive means for the lower reach of said belt from said variable speed drive during advance of said spreader conveyor, a separate motor for driving said reversible conveyor drive means at said higher speed and in a direction to retract said spreader conveyor and deposit a row of patties in said discharge conveyor, and clutch means engageable for driving said reversible conveyor drive means by said separate motor for retraction of said spreader conveyor.

3. Spreader conveyor apparatus of the type comprising an endless spreader conveyor belt, a discharge conveyor running laterally beneath the delivery end of said spreader conveyor belt, article supply means for depositing articles on the upper reach of said spreader conveyor belt, and drive means for advancing and retracting the delivery end of said spreader conveyor belt across said discharge conveyor; the improvement comprising laterally spaced tracks extending laterally of said discharge conveyor, a fixed length spreader conveyor frame shiftable in said tracks, means mounting said spreader conveyor belt for travel around said frame, said spreader conveyor drive means comprising a sprocket for engaging and advancing the upper reach of said spreader conveyor belt, means for driving said belt advancing sprocket continuously the belt advancing direction, a reversible sprocket engaging the lower reach of said spreader conveyor belt, means for driving said reversible sprocket in the opposite direction and at substantially the same speed as said belt advancing sprocket for advancing both reaches of said spreader conveyor belt and the frame across said discharge conveyor while receiving a row of patties, and means for driving said reversible sprocket in the opposite direction and at a speed higher than that of said belt advancing sprocket for quickly retracting both the spreader conveyor frame and the delivery end of the belt for depositing a row of patties in said discharge conveyor and while said belt advancing sprocket continues to advance the upper reach of said spreader conveyor belt relative to the frame for receiving articles from said supply means.

4. The apparatus of claim 3, wherein said unidirectional and reversible sprockets have the same pitch diameter.

5. The apparatus of claim 3, wherein said spreader conveyor belt is formed of wire cross rods, said sprockets directly driving said cross rods.

6. The apparatus of claim 3, wherein said article supply means comprises a patty forming machine, a continuously driven shaft in said patty machine, a variable speed drive between said shaft and said belt advancing sprocket, clutch means engageable for driving said reversible sprocket from said variable speed drive during advance of said spreader conveyor frame and belt, a separate motor for driving said reversible sprocket in the opposite direction for retraction of both said spreader conveyor frame and the delivery end of the belt, clutch means engageable for driving said reversible sprocket by said separate motor during said retraction, and control means for said clutch means operated at ends of the advance and retraction strokes of said spreader conveyor.

7. Spreader conveyor apparatus for a patty machine wherein said patty machine has a continuously rotating shaft that makes one revolution for each patty delivered by the machine, and an endless chain spreader conveyor belt for receiving patties from the patty machine and distributing them along a laterally running discharge conveyor; the improvement wherein said spreader conveyor belt runs freely around a fixed length, longitudinally shiftable frame, means for driving the upper reach of said spreader conveyor belt continuously from said patty machine shaft in the belt advancing direction and at a relatively low speed, advance clutch and drive means for driving the lower reach of said spreader conveyor belt from said patty machine shaft in the same direction as said upper reach is driven and at said relatively slow speed when said advance clutch means is engaged to thereby advance said frame and both conveyor belt reaches as a unit, retract clutch and drive means for driving the lower reach of said spreader conveyor belt in the opposite direction and at a relatively high speed when said retract clutch means is engaged and when said advance clutch means is disengaged for retracting the spreader conveyor frame and the delivery end of the belt at a relatively high speed while the upper reach of the belt continues to be driven in said advance direction relative to the frame at said relatively low speed from the patty machine shaft, and control means for engaging said advance clutch means and disengaging said retract clutch means when said conveyor frame is retracted and for disengaging said advance clutch means and engaging said retract clutch means when said conveyor frame is advanced.

8. The apparatus of claim 7, comprising a variable speed drive between said patty machine shaft and said means for continuously driving the upper reach of the spreader conveyor belt.

9. In a spreader conveyor of the type wherein the upper reach of the spreader conveyor belt receives soft articles such as meat patties from a forming machine, drive means for advancing and retracting the delivery end of the belt across a discharge conveyor for dropping rows of patties thereon and control means for said spreader conveyor drive means; the improvement wherein said spreader conveyor belt is trained around a fixed length frame, means for reciprocating the entire belt and the frame for advancing and retracting the delivery end of the belt, a light weight patty sensor positioned to be lifted by a patty at the delivery end of said spreader conveyor belt, a trip plate member that is dropped by lifting of said sensor, electric control means operated by the dropping of said trip plate member for retracting said frame and hence the delivery end of said spreader conveyor belt, and electro-mechanical control means for thereafter advancing said frame and hence the delivery end of said spreader conveyor belt, said electro-mechanical control means for advancing the spreader conveyor comprising a cocking member positioned to be operated by the conveyor upon retraction, and a mechanical connection between said cocking member and said trip plate member for cocking the trip plate member upon retraction of the conveyor.

10. The spreader conveyor of claim 9, wherein said mechanical connection between the cocking member and the trip plate member comprises a longitudinal shaft, and means for slidably coupling said members to the shaft for providing stroke length adjustment of the spreader conveyor.

11. The spreader conveyor of claim 9, wherein said electric control means operated by said trip plate member comprises a magnetically-operated reed switch, said drive means for the spreader conveyor comprising electromagnetic advance and retract clutches controlled by said reed switch.

12. The spreader conveyor of claim 9, comprising a no-patty trip finger for sensing the delivery end of said spreader conveyor directly, said trip finger also dropping said trip plate member when lifted by the end of the spreader conveyor.

13. The spreader conveyor of claim 9, wherein said patty sensor is a light weight freely turning wheel.

* * * * *

UNITED STATES PATENT OFFICE
CERTIFICATE OF CORRECTION

PATENT NO. : 3,804,228
DATED : April 16, 1974
INVENTOR(S) : EUGENE F. FELSTEHAUSEN It is certified that error appears in the above-identified patent and that said Letters Patent are hereby corrected as shown below:

Column 6, line 13, "longitudinal" should be --longitudinally--.

Column 9, line 50, "120" should be --130--.

Signed and Sealed this thirteenth Day of April 1976

[SEAL]

Attest:

RUTH C. MASON
Attesting Officer

C. MARSHALL DANN
Commissioner of Patents and Trademarks